June 8, 1965
H. R. JONES
3,187,719
VACUUM TYPE MILK TRANSFER SYSTEM
Filed Oct. 4, 1963
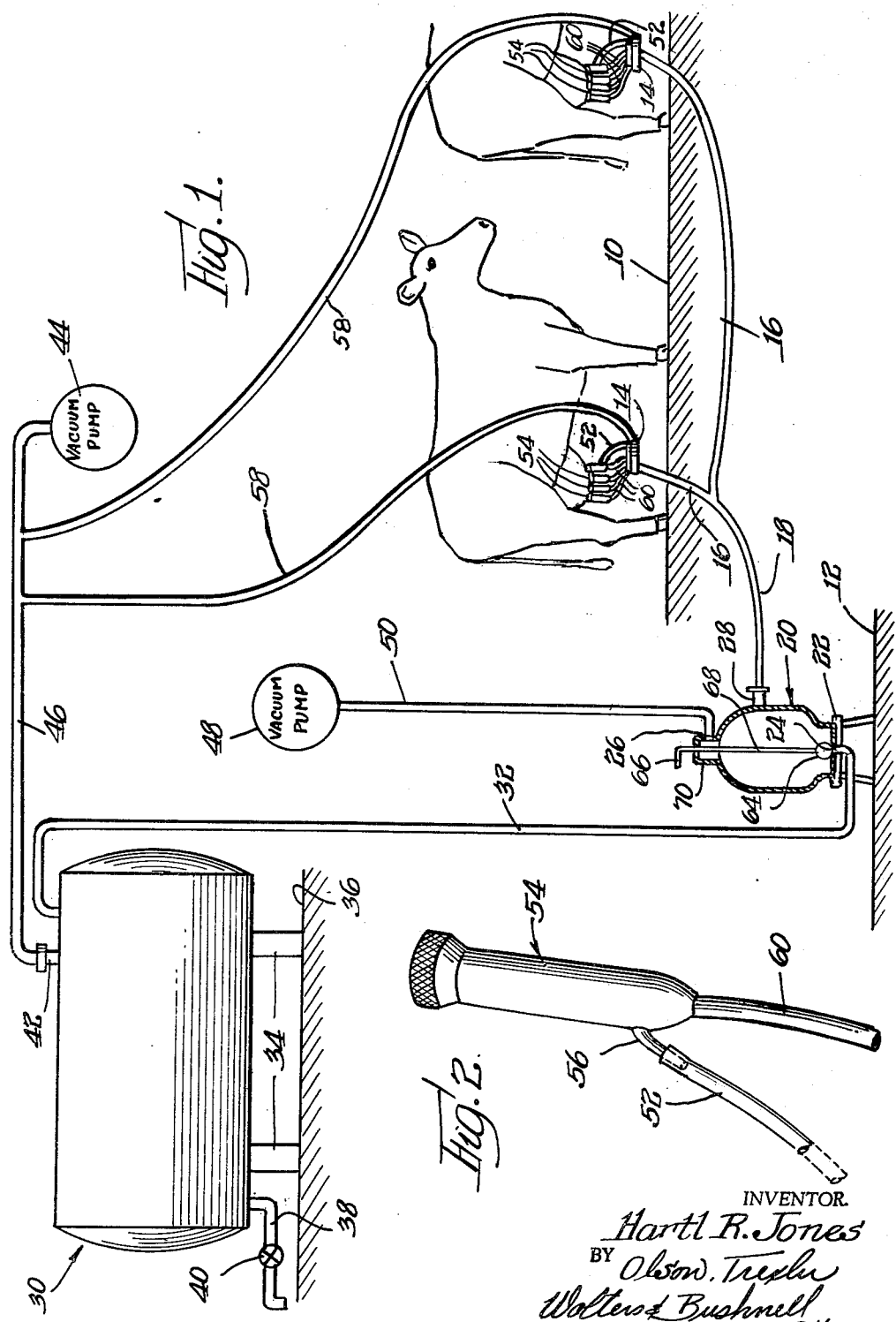
INVENTOR.
Hartl R. Jones
BY Olson, Trexler
Wolters & Bushnell
Atty's.

United States Patent Office 3,187,719
Patented June 8, 1965

3,187,719
VACUUM TYPE MILK TRANSFER SYSTEM
Hartl R. Jones, Chicago, Ill., assignor to Mojonnier Bros. Co., Chicago, Ill., a corporation of Illinois
Filed Oct. 4, 1963, Ser. No. 313,952
7 Claims. (Cl. 119—14.08)

This invention relates generally to milk transfer systems and more particularly to systems for transferring freshly extracted milk to a refrigerated hold tank.

For convenience both in the actual milking operation and in subsequent delivery of bulk milk to the carrier, the cooler or refrigerated hold tank is customarily located at some distance from the milking parlor and usually at an elevated position relative to the floor of the milking parlor. In accordance with modern practice, the freshly extracted milk is directed under vacuum to an intermediate vessel or receiver from which it is conveyed to the bulk tank by a sanitary pump. This pump is operated by an electrical control system that depends on the milk itself to complete a circuit for energizing the pump. As a result of this arrangement, the pump operates periodically and the milk is subjected to considerable agitation both in the milk lines and in the hold tank. The sanitary pump which is required in this arrangement has proved to be an expensive item; and moreover, the electrical controls are somewhat unreliable. Furthermore, excessive agitation during pumping is capable of physically damaging the milk.

Therefore, a general object of the present invention is to provide a new and improved milk transfer system.

Another object of the invention is to provide a milk transfer system that conveys milk exclusively by a vacuum differential.

A further object of the invention is to provide a milk transfer system that is economical to install and reliable to operate.

A yet further object of the invention is to provide a milk transfer system that cooperates with the individual milking machines in insuring safety to the cow being milked.

These and other objects and features of the invention will become more apparent from a consideration of the following descriptions.

A milk transfer system in accord with the invention includes a bulk tank having a connection to a source of relatively high level vacuum. The system of the invention also includes a relatively smaller, receiving vessel which has a milk outlet that is connected to the bulk tank. The receiving vessel is connected to a second, lower level source of vacuum and is connected separately to a milk supply line. A float valve is arranged with the receiving vessel selectively to close the milk outlet in response to the level of milk therein, the vacuum differential between the bulk tank and the receiving vessel serving to transfer the milk from the receiving vessel to the bulk tank. The float valve serves to preserve the vacuum differential between these two tanks when the milk supply dwindles or fails.

In order that the principles of the invention may be readily understood, a single embodiment thereof, but to which the application is not to be restricted, is shown in the accompanying drawing wherein:

FIG. 1 is a schematic view of a milk transfer system constructed and arranged in compliance with the present invention; and FIG. 2 is an enlarged perspective view of a teat cup used in an automatic milking machine of the type contemplated by the present invention, the main suction line connection and the vacuum pulsation line connection to the teat cup being illustrated.

Referring now in detail to the drawing, a milking platform 10 will be seen raised above a floor surface 12 in a conventional milking parlor. The milking platform 10 defines a support surface for two or more cows, milking stalls, not shown, being ordinarily provided for restraining the movement of the cows during the actual milking operation. The milking is done by milking machines which include breaker cups or manifolds 14, breaker cups 14 having outlet lines 16. The lines 16 flow into a single milk supply line 18.

In compliance with the invention, an intermediate vessel or receiver 20 is elevated a short distance above the floor surface 12 by a stool 22 or other like structure. The receiver 20 is of comparatively small volume, being adapted to contain from four to ten gallons fluid measure. For sanitary purposes, the receiver 20 is advantageously fabricated from stainless steel, glass or glass lined steel, being provided with a milk outlet 24, a vacuum connection 26 and a fitting 28 which is used in coupling the milk supply line 18 to the receiver.

The milk outlet 24 of receiver 20 is joined in fluid circuit to a refrigerated bulk tank 30 or other storage vessel by means of a milk lift line 32 which enters the top of tank 30. The bulk tank 30 rests on supports 34 which space the bulk tank above a floor surface 36. The floor surface 36 is located in a milk room and is sometimes disposed at a higher level than either the milking platform 10 or the floor surface 12. In any event, the top of tank 30 is invariably located at a higher level than the milk outlet of receiver 20. The bulk tank 30 is provided with a discharge pipe 38 having a valve 40 therein for controlling the flow of milk from the bulk tank. In addition, the bulk tank 30 is provided with a top connection 42 for coupling the bulk tank to a vacuum pump 44 by means of a vacuum line 46. The vacuum pump 44 is arranged to draw a relatively high vacuum on the bulk tank, vacuums on the order of 16–20 inches of mercury being employed in this regard.

The receiver 20 is also connected to a source of vacuum, specifically a vacuum pump 48 which is coupled to the receiver 20 at the connection 26 by means of a vacuum line 50. The vacuum pump 48 is intended to draw a lower level vacuum than the pump 44, being arranged specifically to draw a vacuum of 10–15 inches of mercury.

The teat cups of the automatic milking machines may derive their sources of vacuum from the pumps 44 and 48. In the illustrated embodiment and with reference to FIG. 2 in conjunction with FIG. 1, a vacuum line 52 is connected to the shell of a teat cup 54 at a side fitting 56 which is connected to a conventional pulsator on the manifold or breaker cup 14 for providing the pulsations needed in proper milking. The vacuum line 52 is connected through the breaker cup 14 and pulsator to a vacuum line 58 which, in turn, is connected to the pump 44. The breaker cup 14 is open to each of the main suction or teat cup lines 60. Each line 60 leads to an axial connection on the rubber liner of teat cup 54, and vacuum is drawn on the lines 60 through the lines 16 and 18, to the receiver 20 and the line 50.

The receiver 20 is arranged to prevent interconnection of the vacuum lines 46 and 50 and is specifically provided with valve means comprising a float ball 64 which cooperates with the milk outlet 24. A manual control handle 66 is connected to the float ball 64 by an operating rod 68, rod 68 passing slidably through a fitting 70 which is of a type adapted to prevent pressure leakage around the rod.

A strainer or filter, not shown, may be placed in the milk transfer system between the receiver 20 and the bulk tank 30. Alternatively, the milk may be strained or filtered between the milk supply line 18 and the receiver 20. Furthermore, one of the vacuum pumps in the system may be eliminated and both lines 46 and 50 connected to the remaining pump if a conventional vacuum differential valve is placed in the line 50 to insure a lower level of vacuum in this latter line.

Having thus described one construction of the invention, it is important now to state how the illustrated embodiment operates.

When the cow's udder has been cleaned and the milking machine attached, milking will proceed in the ordinary manner with the relatively low level vacuum from pump 43 provided the main sucking action and the relatively higher level vacuum from pump 44 providing the required pulsations. As the milk is delivered to the supply line 18, it passes into the receiver 20; and when a sufficient quantity of milk has been accumulated in the receiver 20 to insure a milk seal over the outlet 24, the float ball 64 is raised manually using the handle 66. Thereafter, as additional milk is delivered to the receiver 20, the higher vacuum on bulk tank 30 will permit the higher pressure or lower vacuum in the receiver to lift the milk through line 32 into the bulk tank. This gentle lifting action avoids agitating the milk to any appreciable degree and thereby effectively prevents physical damage to the milk. Furthermore, the milk is raised from the receiver 20 to the bulk tank 30 in a substantially continuous flow; and this rather continuous flow tends to prevent back surges in the vacuum line 50. Accordingly, variation in the vacuum to the teat cups is avoided. The milk transfer system of the invention thus avoids or eliminates a principal factor in inducing mastitis. As will be recognized, lifting of the milk to the bulk tank is achieved without the need for a centrifugal or other mechanical pump or for electrical control devices. In addition, the receiver 20 acts as a vacuum reservoir to prevent any sharp or extreme fluctuations in vacuum.

Should the level of milk in the receiver 20 drop for any reason during operation of the system, the float ball 64 will descend to seat itself over the milk outlet 24 whereby to prevent any connection between the vacuum lines 46 and 50.

The handle 66 may also be employed to raise the float ball 64 to hold the various lines open to each other during the cleaning operation.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

I claim:

1. In a milk transfer system, the combination comprising: a first closed vessel of comparatively large internal volume for storing a substantial quantity of milk, said vessel having means for making a connection to a first source of vacuum and means providing a milk inlet; a second closed vessel of comparatively smaller volume including means for making a connection to a second relatively lower level source of vacuum, means for making a connection to a milk supply line, and means providing a milk outlet; and conduit means connecting said milk inlet and said milk outlet in fluid circuit whereby to permit the difference in said vacuums to transfer milk from said second vessel to said first vessel.

2. In a milk transfer system, the combination comprising: a first closed vessel of comparatively large internal volume for storing a substantial quantity of milk, said vessel having means for making a connection to a first source of vacuum and means providing a milk inlet; a second closed vessel of comparatively smaller volume including means for making a connection to a second, relatively lower level source of vacuum, means for making a connection to a milk supply line, and means providing a milk outlet; valve means operative to close said milk outlet selectively; and conduit means connecting said milk inlet and said milk outlet in fluid circuit whereby to permit the difference in said vacuums to transfer milk from said second vessel to said first vessel.

3. In a milk transfer system, the combination comprising: a first closed vessel of comparatively large internal volume for storing a substantial quantity of milk, said vessel having means for making a connection to a first source of vacuum and means providing a milk inlet; a second closed vessel of comparatively smaller volume including means for making a connection to a second, relatively lower level source of vacuum, means for making a connection to a milk supply line, and means providing a milk outlet; float valve means operative to close said milk outlet selectively in response to the level of milk in said second vessel; and conduit means connecting said milk inlet and said milk outlet in fluid circuit whereby to permit the difference in said vacuums to transfer milk from said second vessel to said first vessel.

4. The combination according to claim 3 wherein said float valve means includes manual, valve release means.

5. A milk transfer system for use with automatic milking machines comprising: a milk supply line adapted to receive freshly extracted milk from a plurality of automatic milking machines; a closed receiving vessel connected to said supply line and having a milk outlet; means developing a first, relatively low level vacuum connected to said receiving vessel and adapted to be connected to the main suction lines of the automatic milking machines; valve means arranged with said receiving vessel for selectively opening and closing the milk outlet thereof; a bulk tank connected to said receiving vessel at said milk outlet; and means developing a second, relatively higher level of vacuum connected to said bulk tank and adapted to be connected to the pulsator lines of the automatic milking machine.

6. A milk transfer system for use with automatic milking machines comprising: a milk supply line adapted to receive freshly extracted milk from a plurality of automatic milking machines; a closed receiving vessel connected to said supply line and having a milk outlet; means developing a first, relatively low level vacuum connected to said receiving vessel and adapted to be connected to the main suction lines of the automatic milking machines; valve means arranged with said receiving vessel for selectively opening and closing the milk outlet thereof; a bulk tank disposed at a higher elevation than said receiving vessel and connected to said receiving vessel at said milk outlet; and means developing a second, relatively higher level of vacuum connected to said bulk tank and adapted to be connected to the pulsator lines of the automatic milking machines, the differential between said first and second vacuums acting to lift the milk from said receiving vessel to said bulk tank.

7. A milk transfer system for use with automatic milking machines comprising: a milk supply line adapted to receive freshly extracted milk from a plurality of automatic milking machines; a closed receiving vessel connected to said supply line and having a milk outlet; means developing a first, relatively low level vacuum connected to said receiving vessel and adapted to be connected to the main suction lines of the automatic milking machines; float valve means arranged with said receiving vessel to be responsive to the milk level therein for selectively opening and closing the milk outlet thereof; a bulk tank disposed at a higher elevation than said receiving vessel and connected to said receiving vessel at said milk outlet; and means developing a second, relatively higher level of vacuum connected to said bulk tank and adapted to be connected to the pulsator lines of the automatic milking machines, the differential between said first and second vacuums acting to lift the milk from said receiving vessel to said bulk tank and said float valve means acting to preserve said vacuum differential.

(References on following page)

References Cited by the Examiner

UNITED STATES PATENTS

| | | | |
|---|---|---|---|
| 739,150 | 9/03 | Canon | 103—235 |
| 854,643 | 5/07 | Hartnett et al. | 119—14.08 |
| 2,015,127 | 9/35 | Rieger | 103—236 |
| 2,805,643 | 9/57 | Hill | 119—14.07 |
| 2,808,025 | 10/57 | Graves | 119—14.46 |
| 2,895,450 | 7/59 | Hope | 119—14.11 |
| 2,982,247 | 5/61 | Varese et al. | 119—14.11 |
| 2,997,049 | 8/61 | Thomas | 119—14.18 X |
| 3,116,714 | 1/64 | Bender | 119—14.18 |
| 3,139,857 | 7/64 | Merritt et al. | 119—14.46 |

SAMUEL KOREN, *Primary Examiner.*

ALDRICH F. MEDBERY, *Examiner.*